E. F. COLLINS.
TEMPERATURE CONTROL APPARATUS.
APPLICATION FILED MAY 6, 1918.
1,287,236.
Patented Dec. 10, 1918.
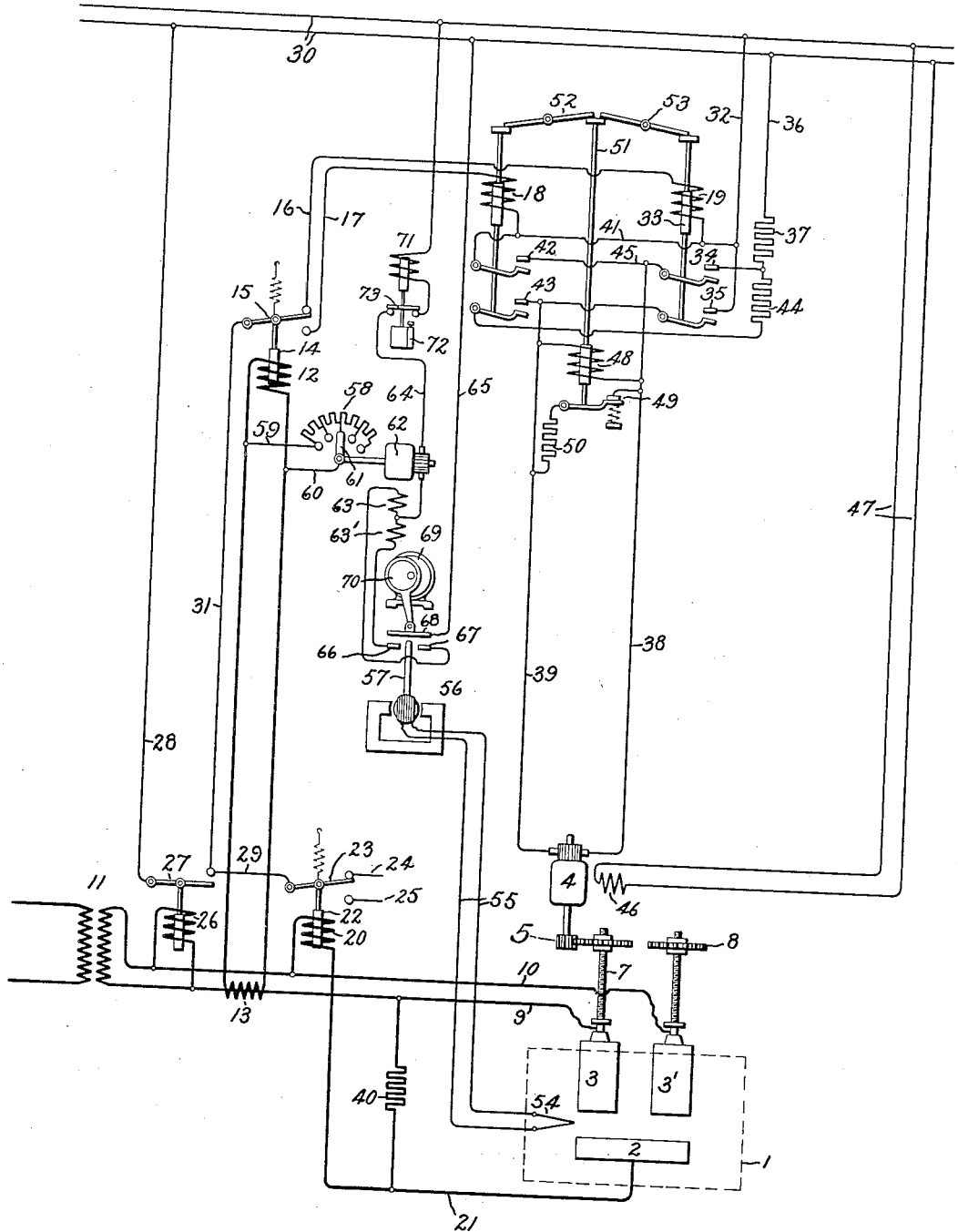
Inventor:
Edgar F. Collins,
by Albert G. Davis
His Attorney.

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

TEMPERATURE-CONTROL APPARATUS.

1,287,236.     Specification of Letters Patent.     Patented Dec. 10, 1918.

Application filed May 6, 1918. Serial No. 232,755.

*To all whom it may concern:*

Be it known that I, EDGAR F. COLLINS, a citizen of the United States, residing at Schenectady, in the county of Schenectady, State of New York, have invented certain new and useful Improvements in Temperature-Control Apparatus, of which the following is a specification.

The present invention relates to the temperature control of electric furnaces and ovens, and is embodied in a regulating apparatus for electric arc furnaces, although not limited to this particular type of furnace.

Regulating devices for electric furnaces have been operated in some cases in response to the variation of the drop of voltage across an arc or resistance, or a variation of the amperage of the operating current. In other cases the energy input of electric furnaces, or other heating devices, has been directly controlled by thermostats, or pyrometers acting to turn on or cut off the heating current. The regulating apparatus embodying my present invention may be said to be a new combination of both these general types of control devices.

It is the object of my invention to provide a regulating device which will provide a rapid input of heat at the beginning of a run when the furnace is cold, or when a fresh charge has been introduced, and a lower rate of heat input when the furnace has been brought up to a desired temperature and it is necessary only to compensate for heat losses, while at the same time providing under all conditions for a regular electrical control, such as the proper maintenance of an arc, or arcs. In other words, it is the object of my invention to enable a furnace to operate in accordance both with desired thermal and desired electrical conditions.

With this object in view my invention includes a process of controlling the temperature by controlling the energy input of said furnace in accordance with an electrical condition of the supply current, for example, the voltage across an arc or other heater, and periodically varying the relation between the rate of heat input and said electrical condition in accordance with the load demands of the furnace. My invention also includes a new apparatus for carrying out this process, the apparatus including a mechanism for controlling the energy input of a furnace responding to the variations of an electrical condition of the current supply and a device for automatically setting the responsiveness of said mechanism in accordance with the temperature or other desired condition.

The accompanying drawing is a diagram of circuit connections of an embodiment of my invention.

Referring to the drawing, an electric furnace is diagrammatically indicated by a rectangle 1 shown in dotted outline, and comprises a stationary conductor or electrode 2 located at the base of the furnace, and movable electrodes 3, 3' adapted to support arcs in series in conjunction with the stationary electrode 2. These electrodes may either all consist of carbon or graphite, or in some cases, the conductor 2 may be a charge of metal, or other conductive material, in the furnace. A motor 4 is mechanically connected to the electrode 3 by any form of suitable gearing, the drawing showing a speed-reducing gear 5 driven by the motor on the screw-threaded rod 7 to raise and lower the electrode. The motor connected to the electrode 3' has not been shown. The electrode is shown as connected to a gearing 8 and it is to be understood that this gearing is connected to a motor and its control apparatus similarly to the motor and control apparatus shown in connection with the electrode 3. The electrodes 3 and 3' are connected respectively to electric mains 9 and 10 receiving electric energy from the secondary of a transformer 11. This particular type of furnace is described for illustrative purposes but it should be understood my invention is of general application.

Before describing in detail the features of my invention as applied to this furnace I will first describe that part of the mechanism which is responsive to an electrical condition. A contactor magnet 12 is connected to the secondary of a current transformer 13, the primary of which is constituted by a portion of the conductor 9. The armature 14 of the contactor 12 is connected to a lever 15 operating to make contact with either conductors 16 and 17 to complete a variable resistance 30.

When the furnace is energized the contactor 26 pulls up its armature and causes the switch lever 27 to complete a circuit between the conductors 28 and 29. In case the energy supply is interrupted at any time the contactor 26 releases and opens the circuit to safeguard the apparatus against injury.

The armature of the current-responsive magnet 12 will then complete a circuit from the conductors 30, which are preferably supplied with direct current, to energize the relay magnet 19, the circuit being through the conductor 28, switch lever 27, the conductors 31, 16, and 32. The magnet 19 will pull up its armature 33, close contacts 34 and 35, and energizes the motor 4, the circuit being through the conductor 36, resistance 37, the contact 34, the conductor 38, the armature of the motor, conductor 39, contact 35, and the conductor 32. The motor is connected to thereupon lower the electrode 3 into electrical connection with the conductor 2. A suitable circuit, for example, a resistance 40, connected across the gap between the electrodes 3 and 2, permits the voltage-responsive contactor 20 to be energized and sets into operation a motor to lower the electrode 3', the control apparatus being like the apparatus energized by the current-responsive contactor.

When contact of both electrodes 3 and 3' with the electrode 2 is established, the electrodes are immediately raised again to strike the arcs. The heavy current flowing in the conductor 9, when electrodes 3 and 3' are in contact with electrode 2 will cause the magnet 12 to pull the switch lever 15 away from the conductor 16 into contact with the conductor 17 thereby deënergizing the magnet 19 and energizing the magnet 18, the circuit being through conductors 28, 31, the lever 15, conductors 17, 41 and 32. A circuit will therefore be completed by the closure of contacts 42 and 43 through the motor armature to cause it to revolve in the opposite direction to raise the electrode 3 and lengthen the arc. The complete circuit is through conductor 36, resistance 37, resistance 44, contact 43, conductor 39, conductors 38, 45, contact 42, and conductors 41 and 32. The field 46 of the motor is constantly energized through the conductors 47, connected to the direct current source 30. The counter electromotive force energizes a contactor 48 connected across conductors 38 and 39 by the closures of the contact 49 inserting a resistance 50 in the armature circuits to quickly bring the motor to rest by dynamic braking. While the motor circuit is closed through the resistance 50, a mechanical interlock 51 brings the closure of the relay magnets 18, 19 by interlocks 52, 53, and before either the magnets 18, 19 can again operate the motor must have come to a stop and released the interlock 51.

The apparatus thus far described is not part of my present invention, but coöperating with and controlling the electromagnetic control apparatus is a thermal regulating system which now will be described.

In good thermal relation with a region in the furnace for which regulation is desired, for example, the heating zone of the furnace, the charge in the furnace, or the heater itself, is a pyrometer 54 which may consist, for example, of a standard thermo couple. This pyrometer is connected by conductors 55 to the terminals of a galvanometer 56. A blade or needle 57 connected with the movable element of the galvanometer is diverted to the right or left by the variation in temperature of the furnace. In shunt to the winding of the contactor magnet 12 is a resistance 58 having a number of taps. A circuit is completed through this resistance through conductors 59, 60, by movable switch blade 61 which is moved into contact with one of the resistance taps by a motor 62. This motor has oppositely wound field windings 63, 63', adapted to be connected in series with the motor armature to the source of direct current 30 through the conductors 64 and 65, the motor rotating in one direction or the other according to which one of these windings is energized. The windings 63 and 63' are connected respectively to stationary contacts 66 and 67. The conductor 65 is connected to a reciprocating contact 68 moved toward and away from the contacts 66 and 67 by a motor 69. The movable blade 68 has been shown as attached to the motor by an eccentric 70, but it is to be understood that any suitable mechanical means may be used to produce the desired reciprocating motion. Any desired form of motor either clockwork or electric motor, may be used to cause a slow reciprocation of the blade 68, for example, it may approach the contacts 66 and 67, once in several minutes. The rate of reciprocation will vary with the size and heat capacity of the furnace.

When the galvanometer 57 is touching either of the contacts 66 or 67, and the reciprocating element 68 is moved into engagement with the blade 57, a circuit is completed through one of the motor fields. The fields are so wound and connected that if the temperature of the furnace is lower than the desired value causing, for example, a deflection of the blade 57 to the left, then the motor 62 is rotated to move the switch blade 61 one step to the right increasing the resistance in shunt to the magnet 12. The "setting" of the magnet is thereby changed so that it will respond to a lower value of current in its windings to cause the switch 15 to be drawn down into contact with the conductor 17, thereby energizing the contactor 18 to close its circuit causing the motor to lower the electrode 3 and increase the heat input by shortening the arc.

The two arcs being in series, an increase of operating current resulting from this shortening of the arc will cause an increase of voltage drop in the voltage controlled arc and hence this arc will automatically be shortened by its control mechanism.

The motor 62 is prevented from moving the switch blade 61 over more than one tap contact at a time by the opening of the series cut-out 71. A dash-pot 72 retards the closing of the cut-out switch 73 until the member 68 has again left the contacts 66 and 67.

If the temperature is still low enough to deflect the galvanometer pointer to the left far enough to make contact between 66 and 68 when the member 68 again approaches the galvanometer, the motor 62 will move the blade 61 another notch thereby again raising the setting of the electromagnetic control and increasing the rate of heat input.

Should the furnace become overheated causing the galvanometer needle to swing to the right, the motor 62 is energized to rotate in the opposite direction to lower the resistance in shunt with the magnet 12 and set the magnet to decrease the heat input.

What I claim as new and desire to secure by Letters Patent of the United States, is:—

1. A regulating apparatus for electric furnaces comprising means for controlling the energy input of said furnace in response to a variation of an electrical condition of a current supplied to said furnace, and means for periodically adjusting the setting of said control means in response to a temperature in said furnace.

2. A regulating apparatus for electric furnaces having coöperating electrodes movable with respect to each to vary an arc between the same, comprising means for regulating the relation of said electrodes in response to a variation of an electrical condition of a current supplied to said electrodes, a pyrometer, and means connected with said pyrometer for changing the setting of said regulating device.

3. A regulating apparatus for electric furnaces having coöperating arcing electrodes, a motor for moving said electrodes, an electric supply circuit for said electrodes, means responsive to an electrical condition in said circuit for controlling said motor, a pyrometer in thermal relation to said furnace, an electro-responsive device connected thereto, and means responsive to said device for adjusting the setting of said motor control means.

4. A regulating apparatus for electric furnaces having coöperating arcing electrodes, a motor for regulating said electrodes, an electric supply circuit connected to said electrodes, an electromagnet responsive to variations of voltage drop across said electrodes for controlling said motor, a resistance in circuit with a winding of said magnet for setting the responsiveness of said magnet, a motor for varying said resistance, a pyrometer, and means for operating said resistance varying motor in response to the electrical variations of said pyrometer.

5. A regulating apparatus for electric furnaces comprising electromagnetic means for controlling the energy input of said furnace in response to a variation of an electrical condition of a current supplied to said furnace, a pyrometer responsive to the temperature of a region in said furnace, a galvanometer in circuit with said pyrometer, and means for periodically adjusting the setting of said electromagnetic means by and in accordance with the deflections of said galvanometer.

6. The process of controlling the temperature of an electric furnace which consists in supplying said furnace with electric current, regulating the energy consumption in said furnace in accordance with an electrical condition of said supply current, and adjusting the relation between said energy consumption and said electrical condition by the temperature of a region in said furnace.

7. The process of controlling the temperature of an electric furnace having an arcing electrode which consists in supplying said furnace with electric energy, regulating the length of said arc in accordance with an electrical condition of the operating current and adjusting the relation between the arc length and said condition in accordance with the temperature of the region in said furnace.

In witness whereof, I have hereunto set my hand this 3rd day of May 1918.

EDGAR F. COLLINS.